(No Model.)

N. A. B. CHEVALLOT.
FILTERING APPARATUS.

No. 289,980. Patented Dec. 11, 1883.

Witnesses
G. B. Towles
William C. Poulter

Inventor
Nicolas A. B. Chevallot
by Henry Orth
att'y

United States Patent Office.

NICOLAS ANTOINE BASILE CHEVALLOT, OF PARIS, FRANCE.

FILTERING APPARATUS.

SPECIFICATION forming part of Letters Patent No. 289,980, dated December 11, 1883.

Application filed November 18, 1882. (No model.) Patented in France March 25, 1882, No. 148,082; in Belgium October 7, 1882, No. 59,217; in England October 9, 1882, No. 4,794; in Germany October 10, 1882, No. 9,763, and in Austria-Hungary October 17, 1882, No. 35,214 and No. 145.

*To all whom it may concern:*

Be it known that I, NICOLAS ANTOINE BASILE CHEVALLOT, a citizen of France, residing at Paris, France, have invented new and useful Improvements in Filtering Apparatus; and I do hereby declare that the following is a full, clear, and exact description of the invention, which will enable others skilled in the art to which it appertains to make and use the same, reference being had to the accompanying drawings.

My invention relates to improvements in apparatus for filtering liquids; and it consists in the construction of the appliances employed substantially as hereinafter fully described, and specifically pointed out in the claims.

Figure 1:
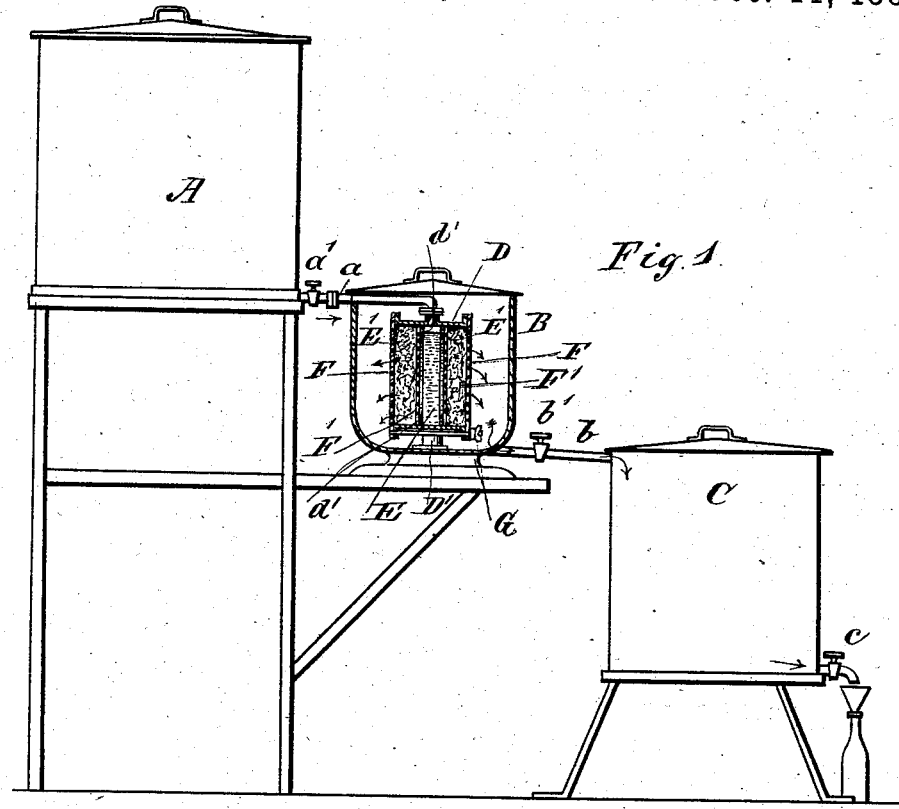
Figure 2:
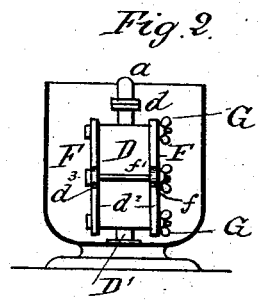
Figure 4:
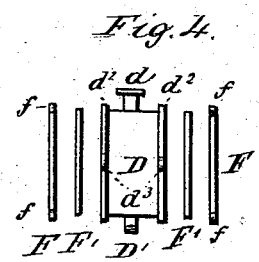
Figure 3:
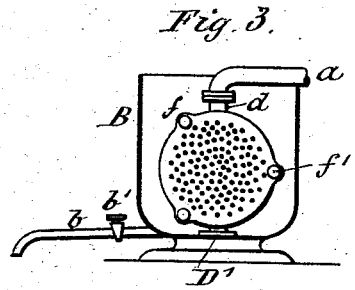
Figure 9:
Figure 6:
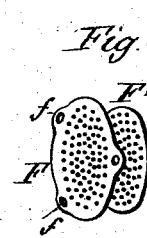
Figures 5, 7, 8:
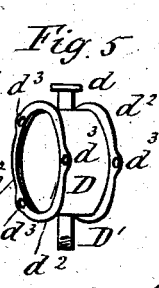

In the accompanying drawings, Figure 1 shows in sectional elevation a convenient arrangement of appliances for filtering liquids. Figs. 2 and 3 are vertical transverse and longitudinal sections of the vessel containing the filter. Fig. 4 is an end elevation of the filter-casing and filter-plates detached. Figs. 5, 6, and 7 are perspective views of the same. Fig. 8 is a perspective view of the filter complete, and Fig. 9 shows the filter-casing in elevation.

Like letters of reference indicate like parts in the above figures of drawings.

A indicates a tank, vessel, or other receiver for the liquid to be filtered; B, a vessel that contains the filter proper; and C, a vessel for the reception of the filtered liquid, as shown in Fig. 1. For convenience these vessels are preferably located one above the other, to give the liquid sufficient head to pass through the filter by its own gravity. When the filtered liquid is to be bottled, I elevate the vessel C sufficiently above the floor to admit a bottle under its spigot $c$, as shown.

The vessel A is in communication with the filter in vessel B by means of a pipe coupled to a pipe, $d$, of said filter, and the vessel B, in which the filter is located, is in communication with the vessel C by a pipe, $b$.

The filter proper is composed of a casing, D, and four filter-plates, two of which being of such a diameter as to fit the outer ends of the casing, and the other two of such a diameter as to fit within the casing, the former filter-plates being denoted by the letters F F, and are provided with perforated lugs or ears $f$, and the latter filter-plates are denoted by the letters F' F', said plates being plainly illustrated in Figs. 2, 3, 4, 6, 7, and 8. The casing D is provided with two interiorly-projecting flanges, $d'$, on opposite sides of its longitudinal center, upon which are loosely seated the filter-plates F' and F', thus forming a central chamber, E, with which the feed-pipe $d$, hereinbefore alluded to, is connected. The casing D is further provided with flanges $d^2$ at each open end, said flanges having perforated lugs or ears $d^3$, and upon said flanged open ends of the cylinder D are seated the filter-plates F F, and connected therewith, as well as with each other, by means of screw-bolts $f'$, carrying thumb-nuts G. The filter-plates F and F', as shown in Fig. 1, occupy such relative positions within the casing as to form a chamber, E', on opposite sides of the central chamber, E, for the reception of a filtering material—such, for example, as carded cotton or any other of the well-known substances used for this purpose.

It is obvious that by means of the thumb-nuts G and bolts $f'$ the filtering material within the chambers may be compressed to any desired degree with the greatest ease, and that ready access is had to the interior of the filter by the same means and by fitting the filter-plates F' F' loosely within the casing.

From what has been said the operation of the filter will be readily understood, especially by an examination of Fig. 1 of the drawings, and may be briefly described as follows: The filter being properly charged with filtering material, it is placed in vessel B or secured to the bottom thereof by means of the supporting leg or standard D', with which said filter is provided. The pipe $d$ is then coupled with the feed-pipe and the stop-cocks $a'$ $b'$ turned on, the stop-cocks $c$ remaining closed. The liquid from vessel A will now pass through pipes $a$ $d$ into the central chamber, E, of the filter, thence laterally through the filter-plates F' F', the filtering material, and out of the filter through filter-plates F F into vessel B, from which the filtered liquid passes through pipe

*b* into the receiver C, from which latter said liquid may be drawn and bottled or otherwise used.

In the drawings I have shown an arrangement of apparatus whereby the liquid to be filtered is forced through the filtering material by its own gravity, and I have shown a cylindrical or tubular filter-casing and filter-plates of corresponding form, said filter-plates being perforated with numerous perforations.

I wish it understood that I do not desire to limit myself to the arrangement of apparatus or the form of filter and filter-plates, as it is evident that, without departing from the spirit and nature of my invention, the liquid may be forced through the filter mechanically, and said filter may have any other form in cross-section than that shown; and, lastly, that, instead of perforated plates or diaphragms, reticulated diaphragms may be employed, either metallic or textile, according to the nature of the liquid to be filtered, the primary object of this invention being to provide a filter of simple construction, combined with means for compressing the filtering material with ease whenever this is required, and to afford ready access to all the parts or chambers of the filter; and, finally, to provide an efficient filtering apparatus of convenient and compact form.

Having now described my invention, what I claim is—

1. A filter composed of a casing open at both sides, divided into three chambers by means of removable filter-plates or diaphragms, the central chamber serving as a feed-chamber and the chambers on opposite sides of said central chamber as filtering-chambers, whereby the liquid is filtered at both sides of the apparatus, substantially as and for the purpose specified.

2. A filter composed of a shell or casing having a central chamber, to which the liquid to be filtered is fed, and a chamber on opposite sides of such central chamber for the reception of the filtering material, said chambers being formed by two filter-plates fitted loosely upon seats within the shell, and two filter-plates connected together and to said shell to adapt such plates for adjustment relatively to the interior filter-plates, substantially as and for the purpose specified.

3. A filter composed of a casing provided with interior flanges on opposite sides of its center, filter-plates or diaphragms seated loosely upon said flanges, filter-plates seated upon the open ends of the casing, connecting-bolts for connecting the outer filter-plates with each other and with said casing, and tightening-nuts for drawing said plates toward each other to their seats, as set forth.

In testimony that I claim the foregoing I have hereunto set my hand this 6th day of October, 1882.

NICOLAS ANTOINE BASILE CHEVALLOT.

Witnesses:
F. MATRAU.
L. COURRAINT.